US008266684B2

(12) United States Patent
Kline et al.

(10) Patent No.: US 8,266,684 B2
(45) Date of Patent: Sep. 11, 2012

(54) TOKENIZED RESOURCE ACCESS

(75) Inventors: Daniel E. Kline, Quakertown, PA (US); Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 719 days.

(21) Appl. No.: 12/242,150

(22) Filed: Sep. 30, 2008

(65) Prior Publication Data

US 2010/0083386 A1 Apr. 1, 2010

(51) Int. Cl.
*G06F 21/00* (2006.01)

(52) U.S. Cl. .......... 726/9; 726/20; 726/34; 713/189

(58) Field of Classification Search .......... None
See application file for complete search history.

(56) References Cited

U.S. PATENT DOCUMENTS

| 6,263,378 | B1* | 7/2001 | Rudoff et al. ............ 719/327 |
| 6,718,374 | B1 | 4/2004 | Del Sordo et al. |
| 6,745,245 | B1 | 6/2004 | Carpenter |
| 6,904,611 | B1 | 6/2005 | Poli et al. |
| 7,117,482 | B2* | 10/2006 | Nguyen et al. ............ 717/122 |
| 7,120,924 | B1* | 10/2006 | Katcher et al. ............ 725/60 |
| 7,281,138 | B1* | 10/2007 | Di Benedetto ............ 713/189 |
| 7,334,119 | B2 | 2/2008 | Gentil et al. |
| 7,424,680 | B2* | 9/2008 | Carpenter ............ 715/741 |
| 7,610,586 | B2* | 10/2009 | Ismail et al. ............ 718/104 |
| 2001/0013121 | A1 | 8/2001 | Kimball et al. |
| 2003/0005335 | A1* | 1/2003 | Watanabe ............ 713/202 |
| 2006/0218547 | A1* | 9/2006 | Purkeypile et al. ............ 717/173 |
| 2007/0198834 | A1* | 8/2007 | Ksontini et al. ............ 713/168 |
| 2009/0100272 | A1* | 4/2009 | Smeets ............ 713/189 |
| 2009/0165111 | A1* | 6/2009 | Zhang et al. ............ 726/9 |
| 2009/0249065 | A1* | 10/2009 | De Atley et al. ............ 713/164 |

FOREIGN PATENT DOCUMENTS

WO WO 2006129202 A2 * 12/2006

OTHER PUBLICATIONS

Microsoft Corporation, "Access Tokens Technical Reference", Windows Server 2003 Technical Reference, Mar. 28, 2003.
Microsoft Corporation, "Windows XP Professional Resource Kit: User Rights", Nov. 3, 2005.
Gregg Miskelly, "Automatically launching the remote debugging monitor", Microsoft Corporation, Mar. 2004.

* cited by examiner

*Primary Examiner* — Nathan Flynn
*Assistant Examiner* — Michael R Vaughan
(74) *Attorney, Agent, or Firm* — Stewart M. Wiener

(57) ABSTRACT

A method and system for unlocking diagnostic functions in a hardware device for a user. The method obtains a signed permission object for the hardware device, and validates the signed permission object. A memory of the hardware device stores a device identifier and a last recorded sequence number. The signed permission object includes a sequence number and is associated with an expiration counter having an initial value that indicates a lifetime for the signed permission object. When the signed permission object is valid, the method updates the expiration counter to decrease the lifetime of the signed permission object, stores the sequence number associated with the signed permission object as the last recorded sequence number in the hardware device, and unlocks the diagnostic functions for the user based on the signed permission object.

26 Claims, 7 Drawing Sheets

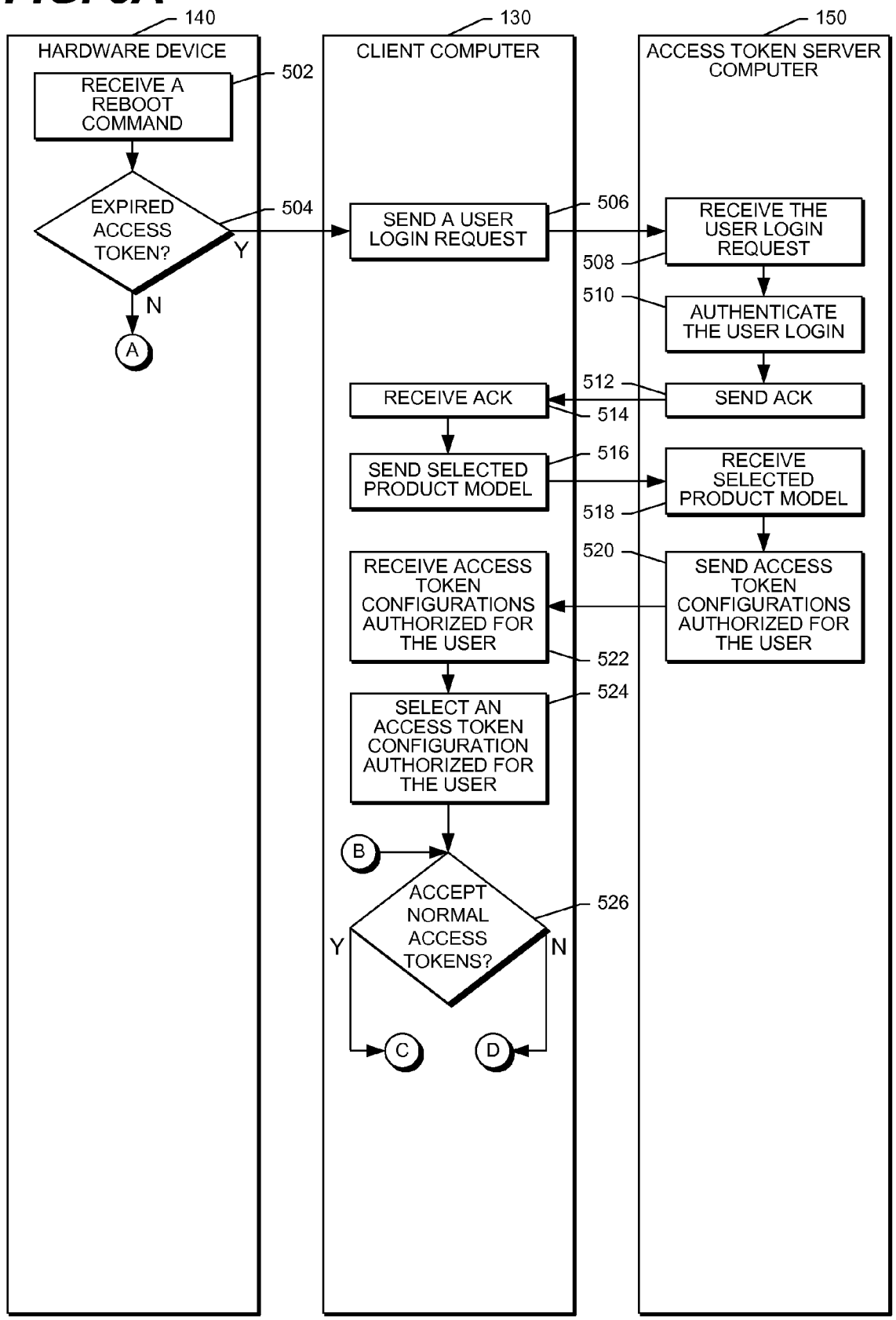

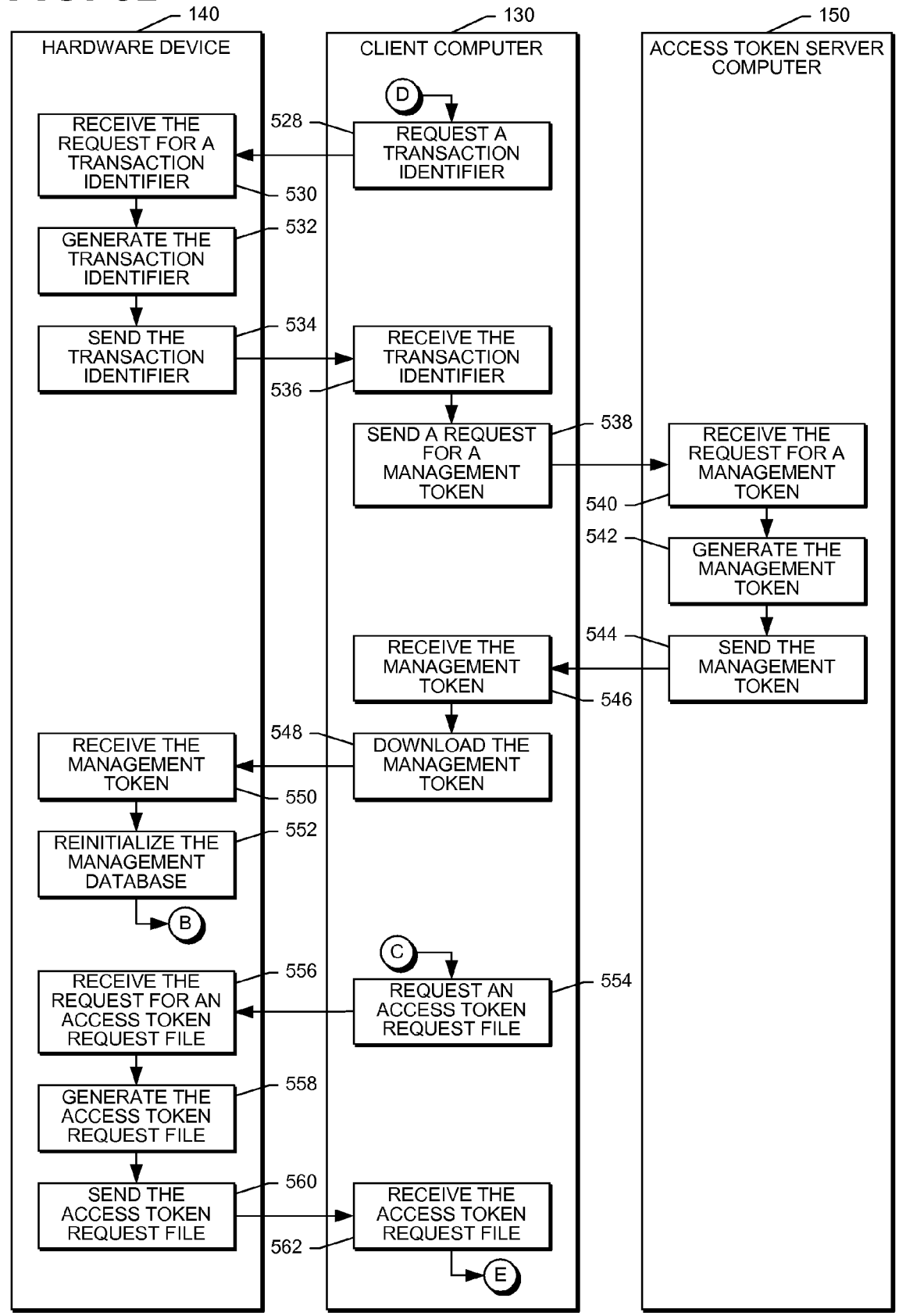

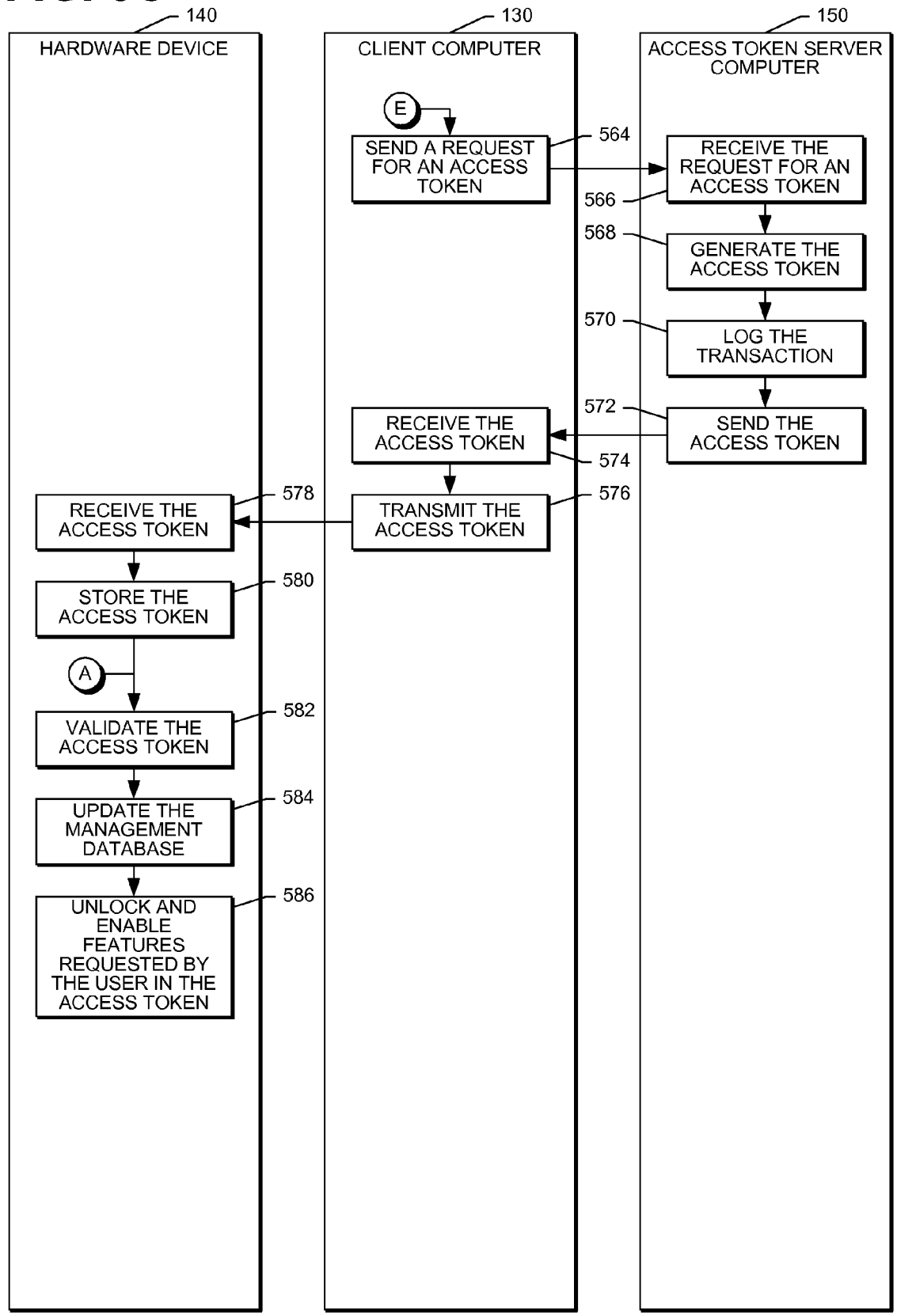

TOKENIZED RESOURCE ACCESS

BACKGROUND

1. Field

The present invention relates, in general, to conditional access to diagnostic functions in a hardware device.

2. Description of the Related Art

A typical digital or cable television system includes a hardware device, such as a set-top box, that connects a subscriber's television, and possibly other electronic equipment, to a cable network. The hardware device typically connects to the cable network via a co-axial wall outlet.

A prior art solution to secure debugging is to have a separate hardware configuration for test/prototype devices. For example, a test device either can accept unsigned/unverified code, or can require code to be signed with a separate test key. On the other hand, a production device with a production hardware configuration only accepts code signed with a production-signing key. This prior art method would thus prevent insecure debugging code from running in production devices that can be sold to a consumer and require a higher level of security.

These prior art solutions do not solve all of the debugging needs, however. For example, a production box already sold to a consumer could malfunction and is then returned back to the manufacturer for investigation. In this case, there is a clear need to perform debugging functions on a production box and not on a test box.

Furthermore, some functions are simply not available in test boxes. For example, some cable set-top boxes will not output video unless they have a CableCARD removable PCMCIA module plugged in. Also, only production boxes containing the necessary secret keys are able to communicate with a CableCARD. Thus, if an engineer needs to debug a problem related to the CableCARD interface, there is no choice but to perform debugging in a production device.

Other related prior art makes use of digital certificates to verify a signed code image that is accepted by a particular device. In some cases, a digital certificate contains a device identifier attribute that is unique to one specific device. This digital certificate would be issued to a developer thus enabling him to sign code that will run only on one device. This could be test code with insecure/debugging functions. A digital certificate binds this code to one particular prototype device; this code cannot run anywhere else and so cannot be used to compromise production devices.

Such a digital certificate bound to one device, however, is difficult to expire and has limited flexibility. Normally, such device-bound digital certificates do not include an expiration time attribute since most consumer devices do not have a reliable and secure source of time. Also, there is no other mechanism to make such a digital certificate expired or invalid. Within the related art, either this bound digital certificate unlocks all possible debugging functions or it unlocks a very limited set of debugging functions enforced by a hardware platform. It is not possible to easily add control of new debugging capabilities as they become available.

Furthermore, this method has a disadvantage that debugging permissions are tied to a signed code image (in a form of a digital certificate). In order to change debugging permissions, it becomes necessary to reload a different code image signed with a different certificate. It is often more convenient to control debugging privileges independent of which code is running in a particular device. If a returned unit comes from the field and requires debugging, it may be necessary to reproduce the problem with the exact same software image already in the device and thus there is a need to control debugging capabilities without touching the software already in the device.

In the case of unlocking diagnostic features, including debugging features, additional security mechanisms are necessary to account for the expiration of those features and, in addition, the system cannot rely on continuous connectivity from the set-top box to a head-end. Even though a hardware device, such as a set-top box, may not be on-line or may have some code bugs that do not allow it to get on-line, there is still a need to securely enable and disable diagnostic and debugging features to resolve a problem with the hardware device.

Furthermore, the act of unlocking the diagnostic and debugging features in a hardware device makes an unlocked device unsuitable for production and a security risk, regardless of how the hardware device was unlocked. Therefore, an audit trail is needed to keep track of which users unlocked which devices, and to make sure that such devices do not make it into the field and also to find those users that violated security policy and misused debugging features to reverse engineer a device, steal secret keys, etc.

Thus, there is a demand for a system and method for unlocking diagnostic functions in a hardware device for a user. Aspects of the presently disclosed invention are able to satisfy this demand.

SUMMARY

Embodiments of the present invention provide a method and system for unlocking diagnostic functions in a hardware device for a user. The method obtains a signed permission object for the hardware device, and validates the signed permission object. A memory of the hardware device stores a device identifier and a last recorded sequence number. The signed permission object includes a sequence number and is associated with an expiration counter having an initial value that indicates a lifetime for the signed permission object. When the signed permission object is valid, the method updates the expiration counter to decrease the lifetime of the signed permission object, stores the sequence number associated with the signed permission object as the last recorded sequence number in the hardware device, and unlocks the diagnostic functions for the user based on the signed permission object.

To obtain a signed permission object, the method either reuses a signed permission object stored in a memory on the hardware device, or requests a signed permission object from a server. To request a signed permission object from a server, the method generates a permission object request file based on information specific to the hardware device, sends it to the server, receives the signed permission object in response, and stores it in the memory on the hardware device. In one embodiment, the server maintains a log that includes an entry indicating the generation of the signed permission object for the hardware device. In one embodiment, the expiration counter measures the lifetime of the signed permission object in a unit of time. In another embodiment, the expiration counter measures the lifetime of the signed permission object in a number of reboots of the hardware device.

To validate the signed permission object, the method examines the signed permission object that includes a digital signature and an object identifier. The method authenticates the digital signature of the signed permission object to determine whether it is authentic. The method also compares the object identifier to the device identifier stored in the memory of the hardware device to determine whether they match. The method also compares the sequence number to the last recorded sequence number stored in the memory of the hardware device to determine whether it is numerically greater. The method also examines the expiration counter associated with the signed permission object to determine whether it indicates that the signed permission object is useable.

In one embodiment, the signed permission object includes secret data. When the signed permission object is valid, the method decrypts the secret data, and uses the decrypted data to unlock the diagnostic functions.

In another embodiment, when a state of the hardware device is indeterminate and the hardware device rejects the signed permission object, the hardware device receives a signed management object, and validates the signed management object. When the signed management object is valid, the method reinitializes the hardware device based on the signed management object. After reinitializing the hardware device based on the signed management object, the hardware device accepts the signed permission object. To validate the signed management object, the method examines the signed management object that includes a management digital signature, a management object identifier, and a transaction identifier. The method authenticates the management digital signature to determine whether it is authentic. The method also compares the management object identifier to the device identifier stored in the memory of the hardware device to determine whether they match. The method also compares the management transaction identifier to the transaction identifier stored in the memory of the hardware device to determine whether they match.

In one embodiment, the memory of the hardware devices stores at least one last recorded sequence number, and associates a server identifier with each last recorded sequence number. The signed permission object includes a source identifier to identify a source that generated the signed permission object. To validate the signed permission object, the method compares the source identifier to the server identifiers stored in the memory of the hardware device to obtain the appropriate last recorded sequence number, and then compares the sequence number of the signed permission object to that last recorded sequence number. When the sequence number is numerically greater than the last recorded sequence number that is associated with the server identifier, the signed permission object is valid. Similarly, the signed management object includes a source identifier, and is valid when the server identifier matches the source identifier. The reinitializing of the hardware device is for the server identifier that matches the source identifier.

BRIEF DESCRIPTION OF THE DRAWINGS

FIG. 5A, FIG. 5B, and FIG. 5C are message flow diagrams that illustrate one embodiment of the method of the present invention.

DETAILED DESCRIPTION

Figure 1:
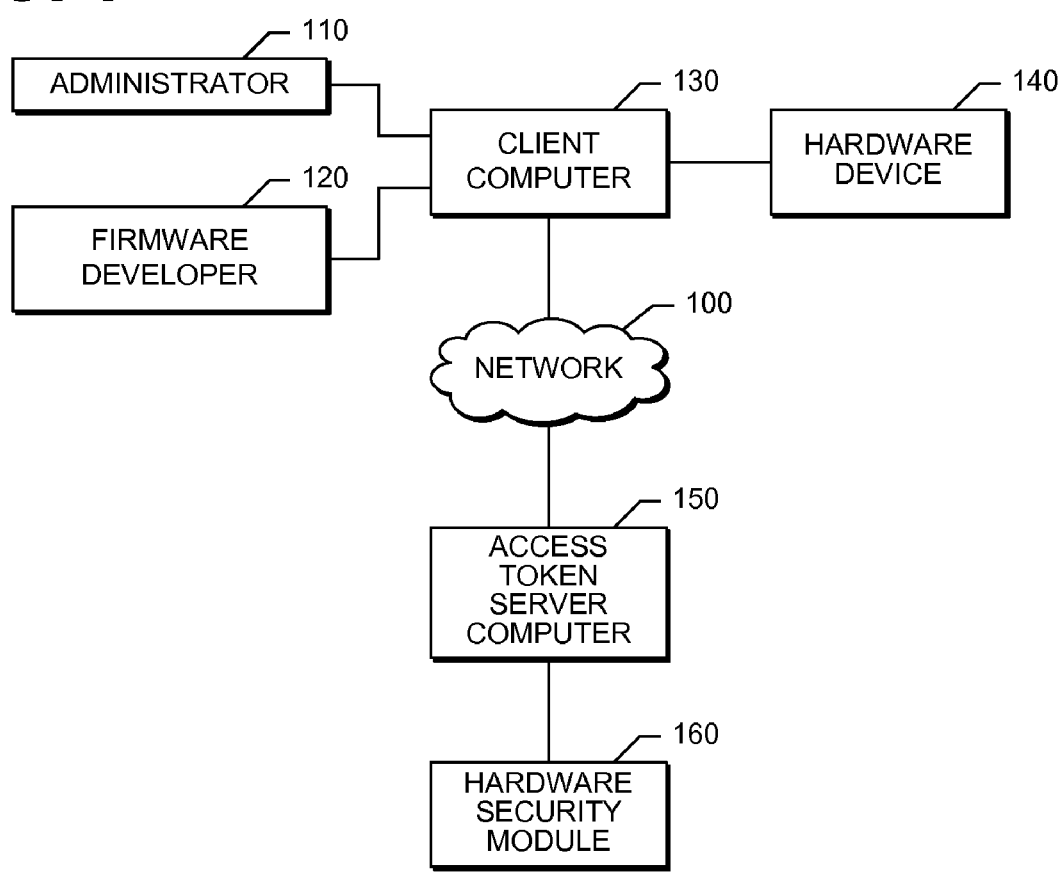
FIG. 1 is network diagram that illustrates one embodiment of the hardware components of a system that performs the present invention.

FIG. 1 is network diagram that illustrates one embodiment of the hardware components of a system that performs the present invention. A client computer 130 connects to a hardware device 140, such as a set-top box, handset, cable converter box, cable modem, satellite receiver hardware, or the like. In one embodiment, a firmware developer 120 operates the client computer 130 to transmit an access token to the hardware device 140 to unlock and enable some resources, including diagnostic functions, debugging functions, and the like, on the hardware device 140. In one embodiment, the client computer 130 transmits the access token via a wired medium, such as a serial communication interface, parallel communication interface, or the like. In another embodiment, the client computer 130 transmits the access token via a wireless medium, such as a Wi-Fi communication interface, physically carrying a memory device such as a universal serial bus (USB) flash drive, or the like. In one embodiment, the client computer 130 transmits the access token as a Base64-encoded file. The hardware device 140 restricts access to sensitive items stored in the hardware device 140 until it receives a validated and authenticated access token that permits access to the sensitive items by a user. Thus, the access token is a permission object that the hardware device 140 uses to restrict access to sensitive items. The access token server computer 150 signs the permission objects so the hardware device 140 can validate the authenticity of the permission object. This is regardless of whether there is secret data inside the permission object. The signing process is not used to hide any data, especially since a public key may be used to "decrypt" the signature. In one embodiment, the permission object may include secret data that should be protected. In that embodiment, the data that should be protected is encrypted independently of the signing/signature. The encryption may employ any prior art encryption method, such as symmetric encryption, asymmetric encryption, or the like.

The architecture shown in FIG. 1 utilizes a network 100 to connect the client computer 130 to an access token server computer 150. In one embodiment, an administrator 110 operates the client computer 130 to communicate via the network 100 with the access token server computer 150 to create or update access token configurations and access control lists. In another embodiment, the firmware developer 120 operates the client computer 130 to communicate via the network 100 with the access token server computer 150 to request an access token. The access token server computer 150 also connects to a hardware security module 160 to encrypt or sign a portion of the generated access token to avoid exposure of the token signing key in software. In yet another embodiment, the architecture shown in FIG. 1 distributes the functions performed by the access token server computer 150 over a front-end server and a back-end server to improve efficiency or security.

The network 100 shown in FIG. 1, in one embodiment, is a public communication network that connects and enables data transfer between the client computer 130 and the access token server computer 150. The present invention also contemplates the use of comparable network architectures. Comparable network architectures include the Public Switched Telephone Network (PSTN), a public packet-switched network carrying data and voice packets, a wireless network, a private network, and the like. A wireless network includes a cellular network (e.g., a Time Division Multiple Access (TDMA) or Code Division Multiple Access (CDMA) network), a satellite network, a wireless Local Area Network (LAN) (e.g., a wireless fidelity (Wi-Fi) network), and the like. A private network includes a LAN, a Personal Area Network (PAN) such as a Bluetooth network, a wireless LAN, a Virtual Private Network (VPN), an intranet, an extranet, and the like. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organizations network. The system also contemplates network architectures and protocols such as Ethernet, Token Ring, Systems Network Architecture, Internet Protocol, Transmission Control Protocol, User Datagram protocol, Asynchronous Transfer Mode, proprietary network protocols comparable to the Internet Protocol, and the like.

Figure 2:
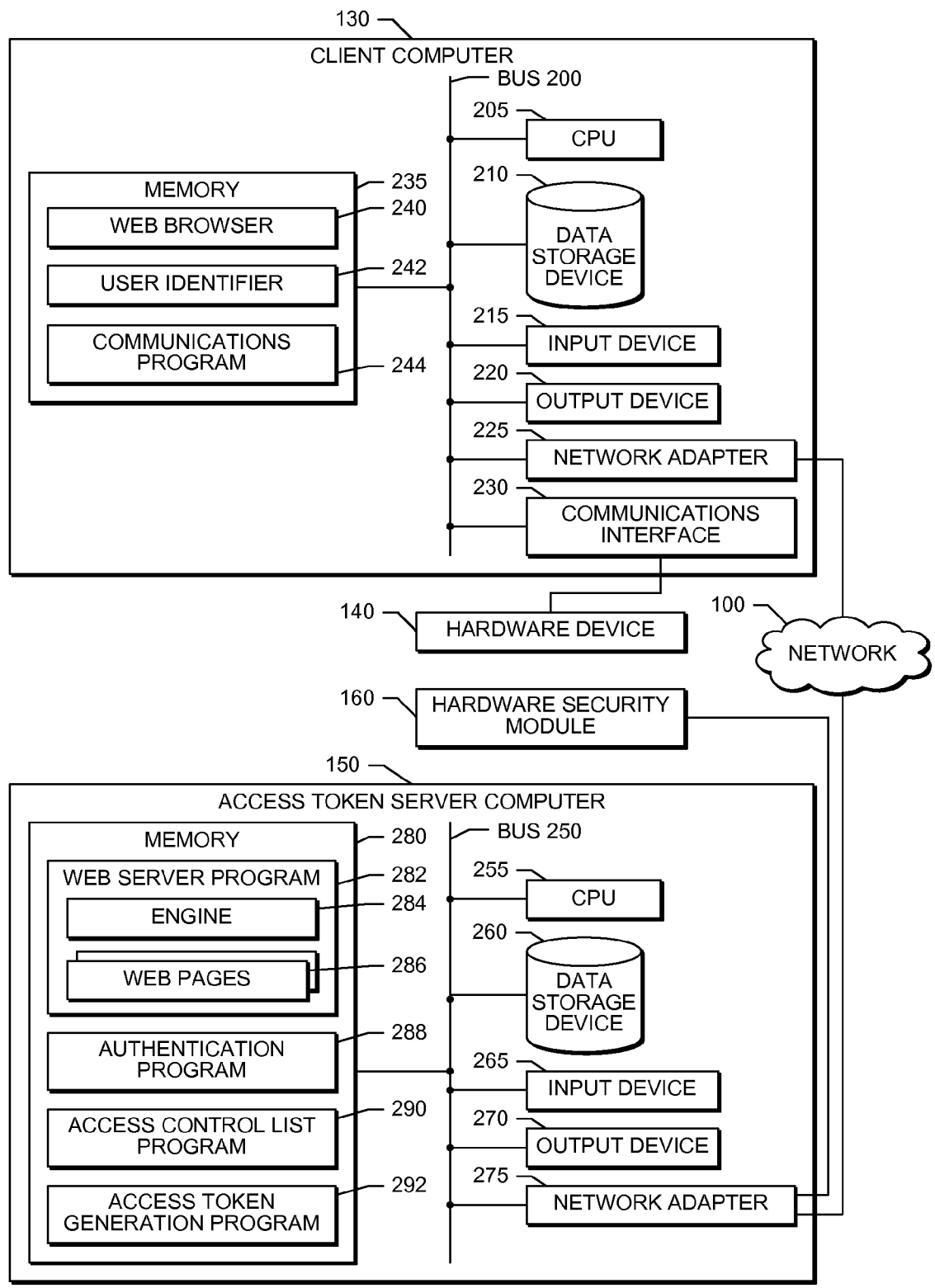
FIG. 2 and FIG. 3 are block diagrams that illustrate, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the client computer 130, and access token server computer 150.

As shown in FIG. 2, the client computer 130 is a general-purpose computer, such as a laptop computer, mobile computer, desktop computer, or the like. A bus 200 is a communication medium that connects a central processor unit (CPU) 205, data storage device 210 (such as a disk drive, flash drive, flash memory, or the like), input device 215 (such as a keyboard, keypad, touchscreen, or the like), output device 220 (such as a monitor, graphic display, or the like), network adapter 225, communications interface 230, and memory 235. The network adapter 225 transmits and receives network traffic for the client computer 130. In one embodiment, the network adapter 225 connects to the network 100 and is the mechanism that facilitates the passage of network traffic between the client computer 130 and the network 100. The communications interface 230 is the mechanism that facilitates the transmission and receipt of data between the client computer 130 and the hardware device 140. In various embodiments, the communications interface 230 is a serial interface, parallel interface, or the like.

The CPU 205 performs the disclosed methods by executing the sequences of operational instructions that comprise each computer program resident in, or operative on, the memory 235. The reader should understand that the memory 235 may include operating system, administrative, and database programs that support the programs disclosed in this application. In one embodiment, the configuration of the memory 235 of the client computer 130 includes a browser program 240, user identifier 242, and communications program 244. The browser program 240 displays web pages on the output device 220. In one embodiment, the user identifier 242 is stored in a file referred to as a cookie. The access token server computer 150 may assign and send the user identifier 242 to the client computer 130 once when the client computer 130 first communicates with the access token server computer 150. From then on, the client computer 130 includes the user identifier 242 with all messages sent to the access token server computer 150 so the access token server computer 150 can identify the source of the message. The communications program 244 provides the user interface that enables the transfer from the client computer 130 of the access token that was downloaded from, and generated by, the access token server computer 150. These computer programs store intermediate results in the memory 235, or data storage device 210. In another embodiment, the memory 235 may swap these programs, or portions thereof, in and out of the memory 235 as needed, and thus may include fewer than all of these programs at any one time.

As shown in FIG. 2, the access token server computer 150 is a general-purpose computer that provides server functionality, such as file services, web page services, or the like. A bus 250 is a communication medium that connects a central processor unit (CPU) 255, data storage device 260 (such as a disk drive, flash drive, flash memory, or the like), input device 265 (such as a keyboard, keypad, touchscreen, or the like), output device 270 (such as a monitor, graphic display, or the like), network adapter 275, and memory 280. The network adapter 275 transmits and receives network traffic for the access token server computer 150. In one embodiment, the network adapter 275 connects to the network 100 and is the mechanism that facilitates the passage of network traffic between the access token server computer 150 and the network 100. In another embodiment, the network adapter 275 connects to the hardware security module 160 and is the mechanism that facilitates the passage of network traffic between the access token server computer 150 and the hardware security module 160.

The CPU 255 performs the disclosed methods by executing the sequences of operational instructions that comprise each computer program resident in, or operative on, the memory 280. The reader should understand that the memory 280 may include operating system, administrative, and database programs that support the programs disclosed in this application. In one embodiment, the configuration of the memory 280 of the access token server computer 150 includes a web server program 282, authentication program 288, access control list program 290, and access token generation program 292. The web server program 282 includes an engine 284, and web pages 286. The engine 282 receives web server request messages sent by the browser program 240 on the client computer 130, and serves the web pages 286 in response to those requests. The authentication program 288, access control list program 290, and access token generation program 292 perform the method of the present invention disclosed in detail in FIG. 5A and FIG. 5B. These computer programs store intermediate results in the memory 280, or data storage device 260. In another embodiment, the memory 280 may swap these programs, or portions thereof, in and out of the memory 280 as needed, and thus may include fewer than all of these programs at any one time.

Figure 3:
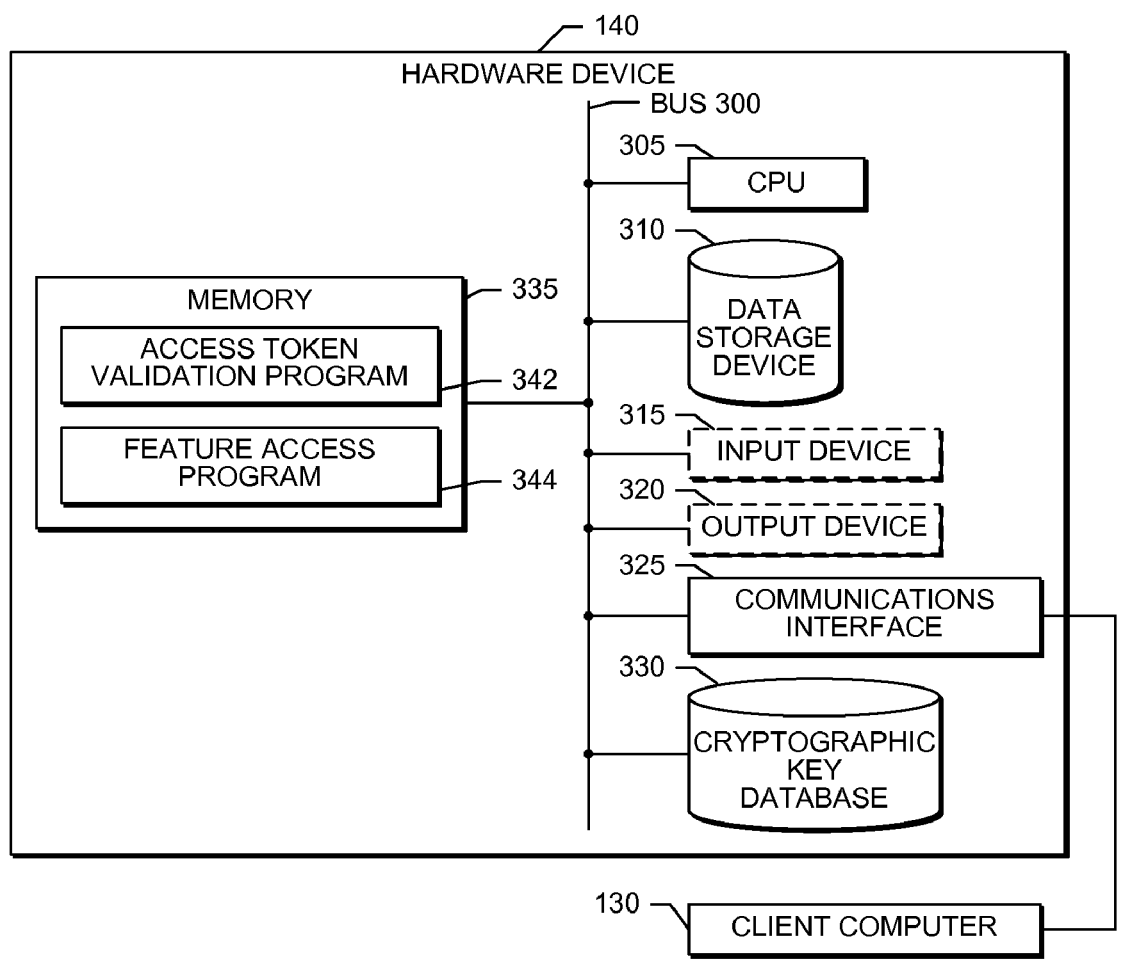

FIG. 3 is a block diagram that illustrates, in detail, one embodiment of the hardware components shown in FIG. 1. In particular, FIG. 3 illustrates the hardware components and software comprising the hardware device 140.

As shown in FIG. 3, the hardware device 140 is a general-purpose computer. In another embodiment, the hardware device 140 is a specialized computer such as a microcontroller. As shown in FIG. 3, a bus 300 is a communication medium that connects a central processor unit (CPU) 305, data storage device 310 (such as a disk drive, flash drive, flash memory, or the like), communications interface 325, cryptographic key database 330, and memory 335. In one embodiment, the bus 300 also connects input device 315 (such as a keyboard, keypad, touchscreen, or the like), and output device 320 (such as a monitor, graphic display, or the like). In another embodiment, the communications interface 325 is the mechanism that facilitates the transmission and receipt of data between the hardware device 140 and the client computer 130. In various embodiments, the communications interface 325 is a serial interface, parallel interface, or the like. In various embodiments, the cryptographic key database 330 stores RSA public/private keys, DSA digital signatures, Triple-DES with a key exchange such as Diffie-Hellman, or the like. When the hardware device 140 receives an access token generated by the access token server computer 150, it uses the cryptographic key database 330 to decrypt the encrypted portions of the access token.

The CPU 305 performs the disclosed methods by executing the sequences of operational instructions that comprise each computer program resident in, or operative on, the memory 335. The reader should understand that the memory 335 may include operating system, administrative, and database programs that support the programs disclosed in this application. In one embodiment, the configuration of the memory 335 of the hardware device 140 includes access token validation program 342, and feature access program 344. The access token validation program 342, and feature access program 344 perform the method of the present invention disclosed in detail in FIG. 5A and FIG. 5B. These computer programs store intermediate results in the memory 335, or data storage device 310. In another embodiment, the memory 335 may swap these programs, or portions thereof, in and out of the memory 335 as needed, and thus may include fewer than all of these programs at any one time.

Figure 4:
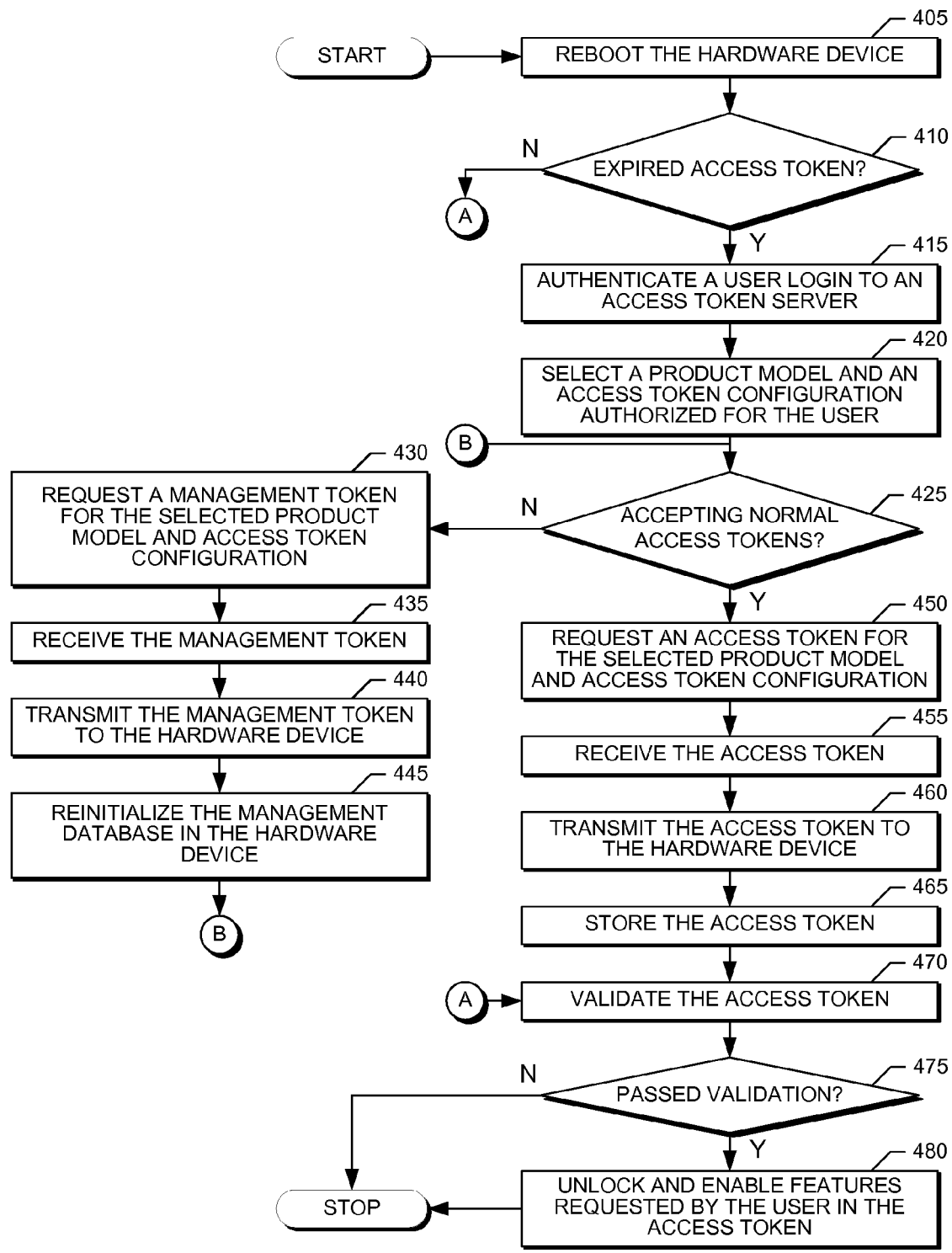
FIG. 4 is a flow chart that illustrates one embodiment of the method of the present invention.

FIG. 4 is a flow chart that illustrates one embodiment of the method of the present invention. The process shown in FIG. 4 begins when a user reboots the hardware device (step 405). When the hardware device reboots, it examines a memory location to determine whether a stored access token is present. If a stored access token is present, the hardware device examines the access token to determine whether it is expired (step 410). If the access token is not expired (step 410, No branch), the hardware device validates the access token (step 470). If the access token does not pass the validation (step 475, No branch), the process ends. If the access token passes the validation (step 475, Yes branch), the hardware device uses the access token to unlock and enable features requested by the user (step 480), and the process ends. If the previously stored access token is either not present or expired (step 410, Yes branch), the user must request an access token for the hardware device from an access token server computer. The access token server computer authenticates a login for the user to the access token server (step 415). In one embodiment, the authentication uses an access control list. After successful authentication, the user selects a product model for the hardware device, and an access token configuration authorized for the user based on the user's privileges (step 420). If the hardware device is not accepting normal access tokens (step 425, No branch), the user sends a request for a management token to the access token server computer (step 430). After receiving the management token (step 435), the user uses a communications interface to transmit it to the hardware device (step 440). After receiving the management token, the hardware device uses it to reinitialize the management database stored in the hardware device (step 445). Since the reinitializing resets the token state machine of the hardware device, the process returns to determine whether the hardware device is accepting normal access tokens (step 425). If the hardware device is accepting normal access tokens (step 425, Yes branch), the user sends a request for an access token to the access token server computer (step 450). After receiving the access token (step 455), the user uses a communications interface to transmit it to the hardware device (step 460). The hardware device stores the access token (step 465) and validates the access token (step 470). If the access token does not pass validation (step 475, No branch), the process stops. In one embodiment, if the access token does not pass the validation test a predetermined number of times, the process will lockout the user to thwart brute force attacks. If the access token passes validation (step 475, Yes branch), the hardware device uses the access token to unlock and enable features requested by the user (step 480), and the process ends.

FIG. 5A, FIG. 5B, and FIG. 5C are message flow diagrams that illustrate one embodiment of the method of the present invention. In particular, FIG. 5A, FIG. 5B, and FIG. 5C illustrate the communication between the hardware device 140, client computer 130, and access token server computer 150 shown in FIG. 1.

The process shown in FIG. 5A, begins when the hardware device 140, such as a set-top box, receives a reboot command (step 502). In one embodiment, a user, such as a firmware developer 120, generates the reboot command by pushing a reset button on the device. In another embodiment, the generation of the reboot command is from a remote device. In yet another embodiment, the hardware device 140 will accept an access token at any time during normal operation. Next, the hardware device 140 examines a memory location to determine whether a stored access token is present.

As shown in FIG. 5A and FIG. 5C, if the stored access token is not expired (step 504, No branch), that is, the stored access token exists and is useable, the hardware device 140 will attempt to reuse it. To reuse a stored access token, the hardware device 140 executes the access token validation program 342 to validate the stored access token (step 582), and updates the stored access token by decrementing an expiration counter associated with the stored access token (step 584). In another embodiment, the expiration counter is an incrementing counter. In yet another embodiment, the expiration counter measures the lifetime for the stored access token in a unit of time, such as second, minutes, hours, or the like. In yet another embodiment, the expiration counter measures the lifetime for the stored access token in a number of reboots of the hardware device. The hardware device 140 then executes the feature access program 344 to unlock and enable features requested by the user in the stored access token (step 586). If the stored access token is expired (step 504, Yes branch), the hardware device 140 obtains a new access token from a user who operates the client computer 13 to login to the access token server computer 150 to request the generation of the new access token.

Referring to FIG. 5A, to login to the access token server computer 150 the user operates a client computer 130 to send a user login request to an access token server computer 150 (step 506). The access token server computer 150 receives the login request (step 508), and authenticates the user login (step 510). In one embodiment, the access token server computer 150 authenticates the user login by executing the authentication program 288 to verify that the user provided the correct user identification and password combination. If the authentication fails, the access token server computer 150 will send a rejection to the user and request that the user try sending another login request. If the authentication passes, the access token server computer 150 sends an acknowledgement (step 512). The client computer 130 receives the acknowledgement (step 514), and proceeds with requesting a new access token.

Referring to FIG. 5A, the user operates the web browser 240 on the client computer 130 to display web pages 286 served by the engine 284 on the access token server computer 150 that allow the user to select a product model of the hardware device 140 that requires a new access token, and send the selected product model to the access token server computer 150 (step 516). The access token server computer 150 receives the selected product model (step 518), and sends the access token configurations that the user is authorized to select (step 520). In one embodiment, the access token server computer 150 determines the authorized access token configurations by executing the access control list program 290 to determine which configurations are authorized for the user login (i.e., user identification and password provided by the user). In one embodiment, the access control list is stored in the data storage device 260 on the access token server computer 150. In another embodiment, the access control list is stored in a separate data storage device accessible via the access token server computer 150 by either a direct connection or a network connection. In yet another embodiment, the access control list is a database accessible via the access token server computer 150. The user operates the web browser 240 on the client computer 130 to display web pages 286 served by the engine 284 on the access token server computer 150 that receive the access token configurations authorized for the user (step 522) from which the user selects an authorized access token configuration that will determine the user preferences for the generation of the new access token (step 524).

Referring to FIG. 5A and FIG. 5B, the user operates the web browser 240 on the client computer 130 to display web pages 286 served by engine 284 on the access token server computer 150 that allow the client computer 130 to select either a normal access token or a management token (step 526). In one embodiment, the client computer 130 automatically makes this determination (step 526) by querying the state of the hardware device 140. In another embodiment, the user queries the state of the hardware device 140 and then manually selects the type of the access token inside the web browser 240 screen. If the access token state machine in the hardware device 140 is indeterminate and the hardware device rejects the signed permission object, or the hardware device is corrupted in some manner (step 526, No branch), the user operates the web browser 240 on the client computer 130 to display the web pages 286 served by engine 284 on the access token server computer 150 that send a request for a transaction identifier to the hardware device 140 (step 528). The hardware device 140 receives the request (step 530), generates the transaction identifier (step 532), and sends the transaction identifier to the client computer 130 (step 534). The client computer 130 receives the transaction identifier (step 536), and sends it with a request for a management token to the access token server computer 150 (step 538). In one embodiment, the access token state machine is indeterminate and not accepting normal access tokens or is corrupted in some manner, when the last sequence number recorded by the hardware device 140 does not agree with the sequence number in the access token. The access token server computer 150 receives the request for a management token (step 540), executes the access token generation program 292 to generate the management token (step 542), and sends the management token to the client computer 130 (step 544). The user operates the web browser 240 on the client computer 130 to display the web pages 286 served by the engine 284 on the access token server computer 150 that receive the management token (step 546), and execute the communications program 244 to download the management token to the hardware device 140 (step 548). The feature access program 344 on the hardware device 140 receives the downloaded management token (step 550), and uses the management token to reinitialize the management database (step 552). In one embodiment, the management token includes a random transaction identifier (nonce) generated by the hardware device 140, provided in management token request, and compared to the management token for verification of the management token before reinitializing the management database. If the transaction identifier in the management token does not match the value in the request, the management token will be rejected and the management database will not be reinitialized. After successful validation of the management token and then after reinitializing the management database, the hardware device 140 is now capable of accepting normal access tokens.

Referring to FIG. 5A, FIG. 5B, and FIG. 5C, if the hardware device 140 is accepting normal access tokens (step 526, Yes branch), the user operates the web browser 240 on the client computer 130 to display the web pages 286 served by the engine 284 that sent a request for an access token request file to the hardware device 140 (step 554). The feature access program 344 on the hardware device 140 receives the request for an access token request file (step 556), and generates the access token request file (step 558) by retrieving information specific to the hardware device 140 and combining that information with the selected product model and selected authorized access token configuration. In one embodiment, the information specific to the hardware device 140 in the access token request file includes a host identifier, processor serial number, x.509 certificate, and the like. The feature access program 344 on the hardware device 140 sends the access token request file to the client computer (step 560). In one embodiment, the hardware device 140 generates the access token request file and stores it in a location that is accessible via download by the client computer 130. The user operates the web browser 240 on the client computer 130 to display the web pages 286 served by the engine 284 on the access token server computer 150 that receive the access token request file (step 562), and send the access token request file, as part of a request for an access token, to the access token server computer 150 (step 564). The access token generation program 292 on the access token server computer 150 receives the request for an access token (step 566), generates the access token (step 568), and sends the access token to the client computer 130 (step 572). In one embodiment, the access token server computer 150 also logs the transaction (step 570) to create a verifiable audit trail of the access tokens generated for each hardware device 140. The user operates the web browser 240 on the client computer 130 to display the web pages 286 served by the engine 284 on the access token server computer 150 that receive the access token (step 574), and transmit the access token to the hardware device (step 576). The feature access program 344 on the hardware device 140 receives the access token (step 578), and stores the access token in a persistent storage location (step 580). The hardware device 140 executes the access token validation program 342 to validate the access token (step 582). In one embodiment, the validation of the access token includes matching an identifier in the access token with the device identifier of the hardware device 140, determining whether a sequence number in the access token is numerically greater than the last sequence number recorded by the hardware device 140, checking for syntax errors in the access token, and verifying the digital signature of the access token using the cryptographic key database 330. If the access token passes the verification, the hardware device 140 updates the management database (step 584). In one embodiment, the updating of the management database includes updating the last recorded sequence number with the value copied from the access token, initializing the access token expiration timer and counter with the values copied from the access token which are continuously decremented until the access token has expired, at which time it is deleted from the hardware device 140. The hardware device 140 then executes the feature access program 344 to unlock and enable features requested by the user in the access token (step 586).

In one embodiment, debugging functions in the hardware device 140 may be unlocked with a secret value that is passed directly to the hardware device 140. In one embodiment, this secret value unlocks a hardware port that allows for the monitoring of the state of the hardware device 140, unlocks services that provide partial or full control of the device hardware 140, or the like. In such cases, the access token server computer 150 may encrypt this secret value using a cryptographic key unique to the hardware device 140 and then includes the encrypted secret as part of the access token. In one embodiment, if the request file includes a digital certificate of the hardware device 140, the access token server computer 150 uses the public key from that certificate to encrypt the secret value. In another embodiment, the access token server computer 150 may be pre-configured in advance with unique device keys that may be used to encrypt this secret value.

After an access token with the secret value is received and validated by the hardware device 140, the hardware device 140 decrypts the secret value and uses it to unlock the associated debugging function. In one embodiment, the secret value is encrypted end-to-end and is never exposed to the user.

In one embodiment, there are two independently-operated access token server computers 150, wherein a first access token server computer for use by the manufacturer of the hardware device 140, and a second access token server computer for use by a software company that writes applications for the hardware device 140 and require debugging during their development. In another embodiment, there are additional access token server computers for use by entities similar to the software company.

The first access token server computer keeps track of a sequence number and always increments the value before inserting it into the next access token. Likewise, the second access token server computer independently keeps track of its own sequence number and increments the value before inserting it into the next access token.

But, there are cases where the same hardware device may need an access token from the first access token server computer, and at other times may need an access token from the second access token server computer. For example, if the same hardware device is first used by the manufacturer of the hardware device 140 to develop some software and is then shipped to the software company so that they can debug and develop their own application for this device. The manufacturer would have loaded into the hardware device 140 one or more access tokens from the first access token server computer, while the software company would have loaded access tokens obtained from the second access token server computer.

Since the first access token server computer and the second access token server computer are not synchronized, the first access token server computer may have first issued an access token with a large sequence number (which was installed into the hardware device 140), and later the second access token server computer could have issued an access token with a small sequence number. In this case, an access token from the second access token server computer is rejected due to a small sequence number even though this use case is legitimate.

In order to make use of access tokens from the second access token server computer, the software company would first need to obtain a management token from the second access token server computer that would reset the management database to a smaller sequence number. This could work but will create a security hole. Once the sequence number in the management database is set to a smaller value, all previously expired access tokens obtained from the first access token server computer can be reused.

To resolve this problem of multiple non-synchronized access token server computers, each normal access token, and also each management token includes a server identifier within the access token. When the hardware device 140 obtains a management token, the server identifier will be recorded along with other state information into the management database in the hardware device 140. The hardware device 140 keeps track of multiple management databases associated with different server identifiers.

Later, when the hardware device 140 obtains a normal access token, its access token verification will be against the specific management database matching the server identifier in that access token. The hardware device 140 will make sure that the sequence number in the access token is strictly greater than the sequence number associated with that specific server.

That way, a management token obtained from a particular server will only enable further normal access tokens issued by the same server. A management token issued by the first access token server computer cannot be used to enable normal access tokens issued by the second access token server computer, thus preventing token replay attacks due to unsynchronized servers (with unsynchronized sequence numbers).

Although the disclosed exemplary embodiments describe a fully functioning system and method for unlocking diagnostic functions in a hardware device for a user, the reader should understand that other equivalent exemplary embodiments exist. Since numerous modifications and variations will occur to those reviewing this disclosure, the system and method for unlocking diagnostic functions in a hardware device for a user is not limited to the exact construction and operation illustrated and disclosed. Accordingly, this disclosure intends all suitable modifications and equivalents to fall within the scope of the claims.

We claim:

1. A method for unlocking debugging functionality in a hardware device for one or more users, comprising:
   obtaining a signed permission object for the hardware device, wherein a memory of the hardware device stores a device identifier, and a last recorded sequence number, wherein the signed permission object includes a sequence number, wherein the signed permission object is associated with an expiration counter having an initial value that indicates a lifetime for the signed permission object, and further wherein the signed permission object is based on a user selected product model and a user authorized configuration;
   validating the signed permission object; and
   when the signed permission object is valid:
      updating the expiration counter to decrease the lifetime;
      storing the sequence number as the last recorded sequence number; and
      unlocking the debugging functionality for the one or more users based on the signed permission object.

2. The method of claim 1, wherein the signed permission object is stored in the memory of the hardware device, and wherein the obtaining of the signed permission object is from the memory.

3. The method of claim 1, wherein the obtaining of the signed permission object further comprises:
   receiving a request for a permission object request file from a server;
   generating the permission object request file based on information specific to the hardware device;
   sending the permission object request file to the server in response to the request;
   receiving the signed permission object from the server;
   storing the signed permission object in the memory of the hardware device; and
   storing the expiration counter in the memory of the hardware device.

4. The method of claim 3, wherein the server maintains a log that includes an entry indicating the generation of the signed permission object for the hardware device.

5. The method of claim 1, wherein the lifetime for the signed permission object is measured in a unit of time.

6. The method of claim 1, wherein the lifetime for the signed permission object is measured in a number of reboots of the hardware device.

7. The method of claim 1, wherein the signed permission object further includes a digital signature, and an object identifier, and wherein the validating of the signed permission object further comprises:
  authenticating the digital signature;
  comparing the object identifier to the device identifier stored in the memory of the hardware device; and
  comparing the sequence number to the last recorded sequence number stored in the memory of the hardware device,
  wherein the signed permission object is valid:
    when the digital signature is authentic,
    when the object identifier matches the device identifier,
    when the sequence number is numerically greater than the last recorded sequence number, and
    when the expiration counter indicates that the signed permission object is usable.

8. The method of claim 7, wherein the memory of the hardware device stores at least one last recorded sequence number, and at least one server identifier, each server identifier associated with one of said at least one recorded sequence number, and wherein the signed permission object further includes a source identifier to identify a source that generated the signed permission object, wherein the validating of the signed permission object further comprises:
  comparing the source identifier to said at least one server identifier stored in the memory of the hardware device; and
  comparing the sequence number to said at least one last recorded sequence number stored in the memory of the hardware device,
  wherein the signed permission object is valid when the sequence number is numerically greater than the last recorded sequence number that is associated with the server identifier that matches the source identifier.

9. The method of claim 1, wherein the signed permission object further includes secret data, and when the signed permission object is valid, the method further comprises:
  decrypting the secret data,
  wherein the unlocking of the debugging functionality for the one or more users is based on the decrypted secret data.

10. The method of claim 1, wherein the diagnostics functions include at least one of a hardware port to monitor a state of the hardware device, and a service to control operation of the hardware device.

11. The method of claim 1 further comprising:
  receiving by the hardware device, the signed permission object from a server via a client computer, and wherein the hardware device is outside the client computer.

12. The method of claim 1 further comprising:
  receiving a signed permission object by the hardware device based on a request for the signed permission object by the user.

13. A system for unlocking debugging functionality in a hardware device for one or more users, comprising:
  a memory device resident in the device; and
  a processor disposed in communication with the memory device, the processor configured to:
    obtain a signed permission object for the hardware device, wherein a memory of the hardware device stores a device identifier, and a last recorded sequence number, wherein the signed permission object includes a sequence number, wherein the signed permission object is associated with an expiration counter having an initial value that indicates a lifetime for the signed permission object, and further wherein the signed permission object is based on a user selected product model and a user authorized configuration;
    validate the signed permission object; and
    when the signed permission object is valid:
      update the expiration counter to decrease the lifetime;
      store the sequence number as the last recorded sequence number; and
      unlock the debugging functionality for the one or more users based on the signed permission object.

14. The system of claim 13, wherein the signed permission object is stored in the memory of the hardware device, and wherein the processor is configured to obtain the signed permission object from the memory.

15. The system of claim 13, wherein to obtain the signed permission object, the processor is further configured to:
  receive a request for a permission object request file from a server;
  generate the permission object request file based on information specific to the hardware device;
  send the permission object request file to the server in response to the request;
  receive the signed permission object from the server;
  store the signed permission object in the memory of the hardware device; and
  store the expiration counter in the memory of the hardware device.

16. The system of claim 13, wherein the lifetime for the signed permission object is measured in a unit of time.

17. The system of claim 13, wherein the lifetime for the signed permission object is measured in a number of reboots of the hardware device.

18. The system of claim 13, wherein the signed permission object further includes a digital signature, and an object identifier, and wherein to validate the signed permission object, the processor is further configured to:
  authenticate the digital signature;
  compare the object identifier to the device identifier stored in the memory of the hardware device; and
  compare the sequence number to the last recorded sequence number stored in the memory of the hardware device,
  wherein the signed permission object is valid:
    when the digital signature is authentic,
    when the object identifier matches the device identifier,
    when the sequence number is numerically greater than the last recorded sequence number, and
    when the expiration counter indicates that the signed permission object is usable.

19. The system of claim 13, wherein the signed permission object further includes secret data, and when the signed permission object is valid, the processor is further configured to:
  decrypt the secret data,
  wherein the unlocking of the debugging functionality for the one or more users is based on the decrypted secret data.

20. The system of claim 13, wherein the diagnostics functions include at least one of a hardware port to monitor a state of the hardware device, and a service to control operation of the hardware device.

21. The system of claim 13, wherein the hardware device receives the signed permission object from a server via a client computer, and wherein the hardware device is outside the client computer.

22. The system of claim 13, wherein the hardware device receives a signed permission object based on a request for the signed permission object by the user.

23. A method for unlocking debugging functionality in a hardware device for one or more users, comprising:
obtaining a signed permission object for the hardware device, wherein a memory of the hardware device stores a device identifier, and a last recorded sequence number, wherein the signed permission object includes a sequence number, and wherein the signed permission object is associated with an expiration counter having an initial value that indicates a lifetime for the signed permission object;
validating the signed permission object; and
when the signed permission object is valid:
updating the expiration counter to decrease the lifetime;
storing the sequence number as the last recorded sequence number; and
unlocking the debugging functionality for the one or more users based on the signed permission object;
wherein when a state of the hardware device is indeterminate and the hardware device rejects the signed permission object, the method further comprises:
receiving a signed management object;
validating the signed management object; and
when the signed management object is valid, reinitializing the hardware device based on the signed management object,
wherein the hardware device accepts the signed permission object after the reinitializing of the hardware device based on the signed management object.

24. The method of claim 23, wherein the signed management object further includes a management digital signature, a management object identifier, and a management transaction identifier, and wherein the validating of the signed management object further comprises:
authenticating the management digital signature;
comparing the management object identifier to the device identifier stored in the memory of the hardware device; and
comparing the management transaction identifier to a transaction identifier stored in the memory of the hardware device,
wherein the signed management object is valid:
when the management digital signature is authentic,
when the management object identifier matches the device identifier, and
when the management transaction identifier matches the transaction identifier.

25. The method of claim 23, wherein the memory of the hardware device stores at least one last recorded sequence number, and at least one server identifier, each server identifier associated with one of said at least one recorded sequence number, and wherein the signed management object further includes a source identifier to identify a source that generated the signed management object, wherein the validating of the signed management object further comprises:
comparing the source identifier to said at least one server identifier stored in the memory of the hardware device,
wherein the signed management object is valid when one of said at least one server identifier matches the source identifier, and
wherein the reinitializing of the hardware device is for the server identifier that matches the source identifier.

26. A system for unlocking debugging functionality in a hardware device for one or more users, comprising:
a memory device resident in the device; and
a processor disposed in communication with the memory device, the processor configured to:
obtain a signed permission object for the hardware device, wherein a memory of the hardware device stores a device identifier, and a last recorded sequence number, wherein the signed permission object includes a sequence number, and wherein the signed permission object is associated with an expiration counter having an initial value that indicates a lifetime for the signed permission object;
validate the signed permission object; and
when the signed permission object is valid:
update the expiration counter to decrease the lifetime;
store the sequence number as the last recorded sequence number; and
unlock the debugging functionality for the one or more users based on the signed permission object;
wherein when a state of the hardware device is indeterminate and the hardware device rejects the signed permission object, the processor is further configured to:
receive a signed management object;
validate the signed management object; and
when the signed management object is valid, reinitialize the hardware device based on the signed management object,
wherein the hardware device accepts the signed permission object after the reinitializing of the hardware device based on the signed management object.

* * * * *